United States Patent [19]
Yagi

[11] Patent Number: 5,808,999
[45] Date of Patent: Sep. 15, 1998

[54] OPTICAL PICKUP APPARATUS AND OBJECTIVE LENS FOR OPTICAL PICKUP APPARATUS

[75] Inventor: Katsuya Yagi, Hachioji, Japan

[73] Assignee: Konica Corporation, Tokyo, Japan

[21] Appl. No.: 848,195

[22] Filed: Apr. 29, 1997

[30] Foreign Application Priority Data

May 17, 1996 [JP] Japan ..................................... 8-123375

[51] Int. Cl.$^6$ ...................................................... G11B 7/12
[52] U.S. Cl. .................. 369/112; 369/44.12; 369/44.37; 369/44.24
[58] Field of Search .................................... 369/112, 109, 369/110, 118, 103, 44.11, 44.12, 44.27, 44.24, 44.37

[56] References Cited

U.S. PATENT DOCUMENTS 5,665,957   9/1997   Lee et al. ......................... 369/44.24 X

*Primary Examiner*—Muhammad N. Edun
*Attorney, Agent, or Firm*—Finnegan, Henderson, Farabow, Garrett & Dunner, L.L.P.

[57] ABSTRACT

An optical pickup apparatus includes: a laser source for emitting a laser light beam; a converging optical system for converging the light beam emitted from the laser source onto an information recording surface through a transparent substrate of an optical information recording medium, the converging optical system including a lens surface so that a spherical aberration is discontinuous in a third numerical aperture (NA3) on a side of the optical information recording medium, and the third numerical aperture (NA3) is satisfied the following condition, $$NA1 > NA3 \geq NA2$$

wherein the first numerical aperture (NA1) is a numerical aperture of the converging optical system on a side of a first optical information recording medium having a first thickness (t1) of transparent substrate, required for obtaining information from the information recording surface of the first optical information recording medium, and the second numerical aperture (NA2) is a numerical aperture of the converging optical system on a side of a second optical information recording medium having a second thickness (t2), which is thicker than the first thickness (t1), of transparent substrate, required for obtaining information from the information recording surface of the second optical information recording medium; and a light detector for detecting a light beam reflected from the information recording surface of the optical information recording medium.

20 Claims, 13 Drawing Sheets

OBSERVATION RANGE

OBSERVATION RANGE OF NA3

SPHERICAL ABERRATION

SPHERICAL ABERRATION

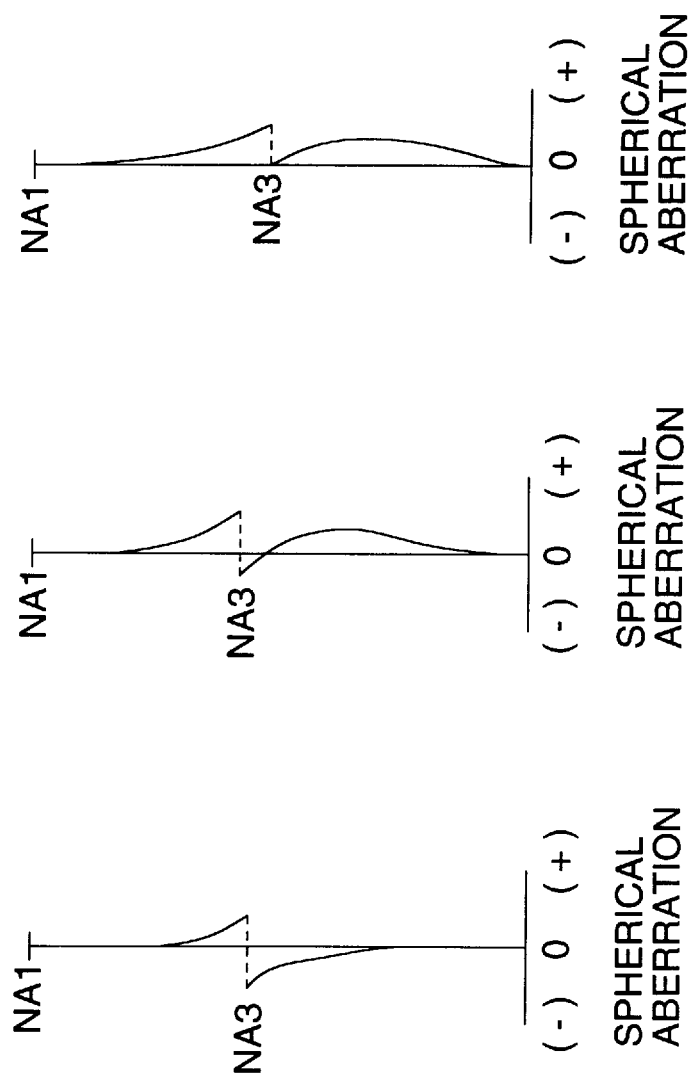

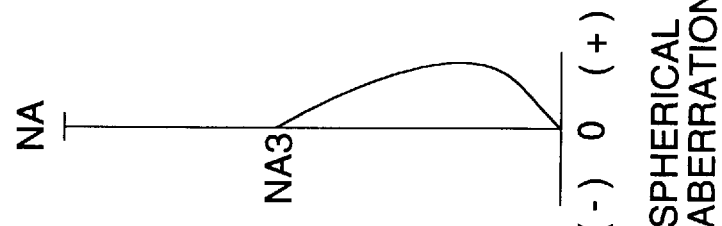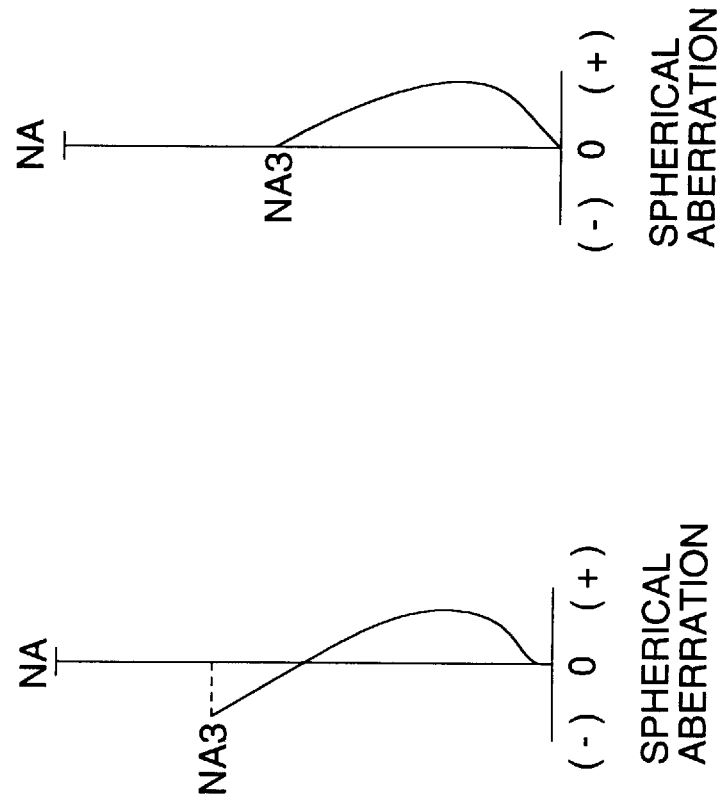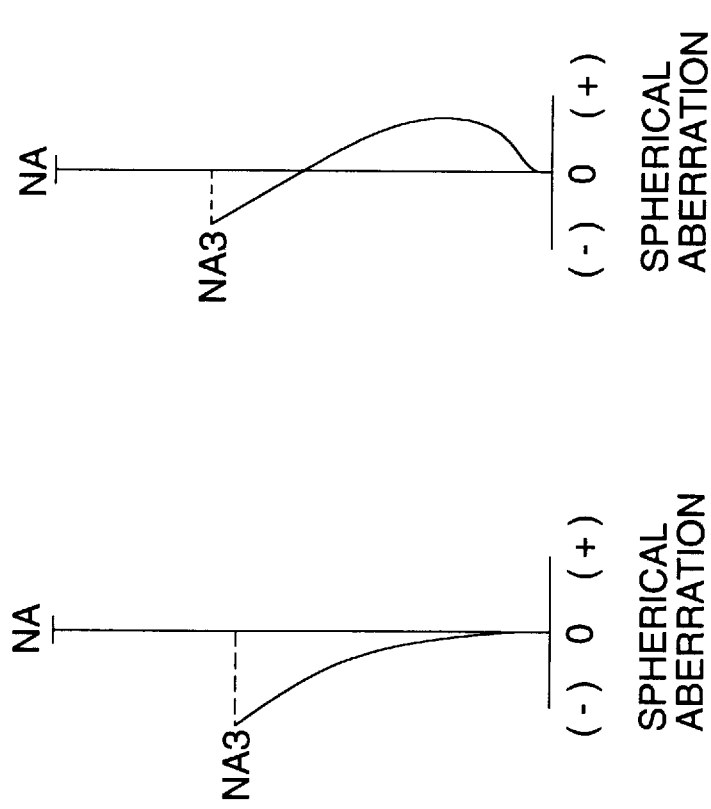

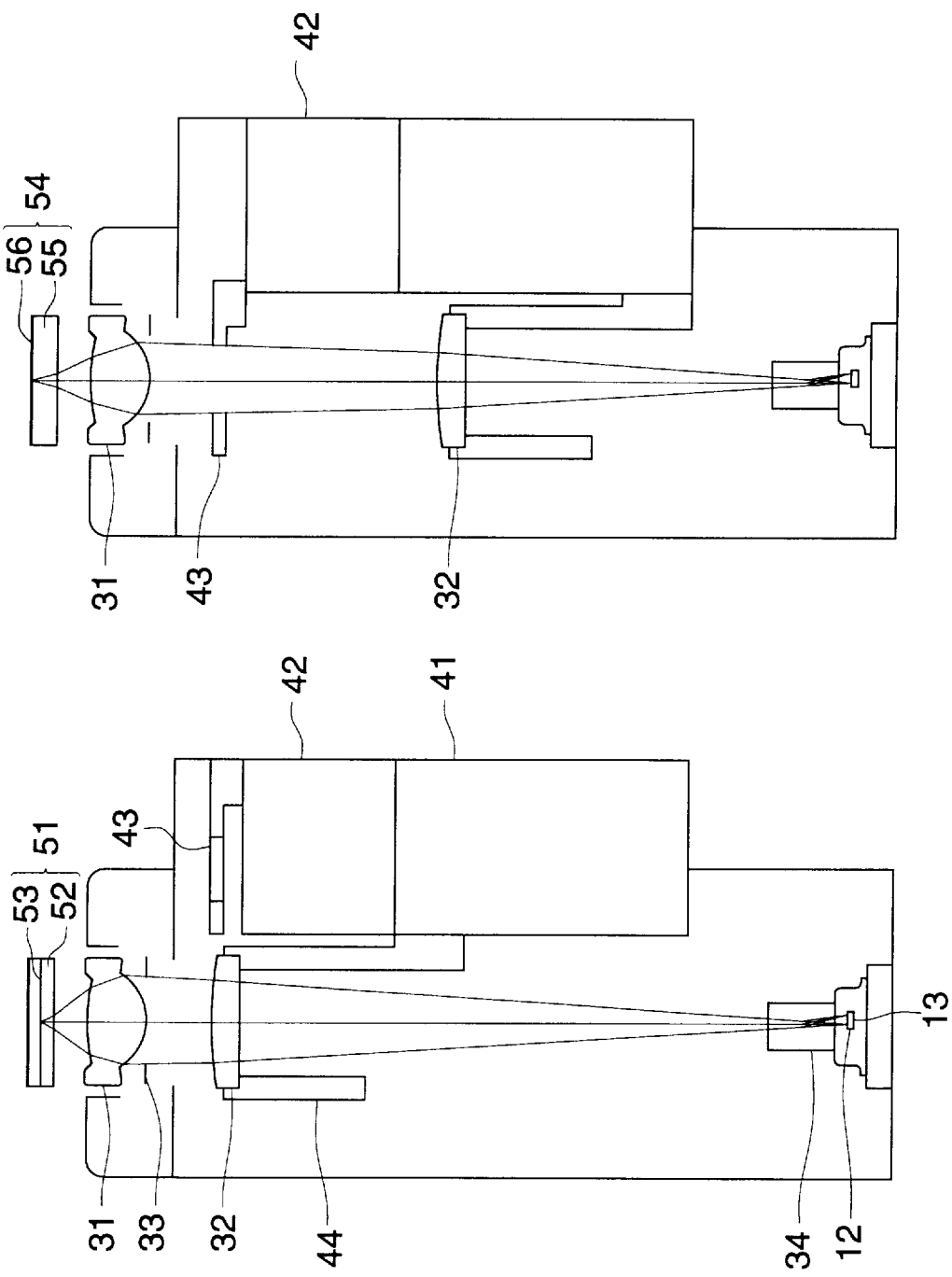

OPTICAL PICKUP APPARATUS AND OBJECTIVE LENS FOR OPTICAL PICKUP APPARATUS

BACKGROUND OF THE INVENTION

The present invention relates to an optical pickup apparatus and an objective lens for the optical pickup apparatus, more specifically an optical pickup apparatus wherein a laser beam emitted from a laser source is converged as a light spot on an information recording surface of an optical information recording medium through a transparent substrate and information is recorded and/or reproduced on the information recording surface, and an objective lens employed in the optical pickup apparatus.

Conventionally, optical pickup apparatuses have been known wherein a laser beam emitted from a laser source is converged as a light spot on an information recording surface of optical information recording media and information is recorded and/or reproduced on the information recording surface.

There are various kinds of the above-described optical information recording media. Second optical information recording media include, for example, a compact disk (hereinafter referred to as CD) and first optical information recording media include, for example, a digital video disk (hereinafter referred to as DVD).

As for the DVD, for obtaining large capacity, are employed a semiconductor red laser having wavelengths of 635 to 690 nm as a light source of the optical pickup apparatus, an objective lens having numerical aperture of 0.6 and moreover, a transparent substrate having thickness of 0.6 mm which is about one half of that of the conventional CD. Additionally, tracking pitch of 0.74 μm and shortest pit of 0.4 μm are employed and are densified by less than one half as compared to the tracking pitch of 1.6 μm and the shortest pit of 0.87 μm of the conventional CD. (1) An applicant of the present invention already applied Japanese Patent Application No. 21225/1996 regarding an optical pickup apparatus which can record and/or reproduce information of optical information recording medium having a different transparent substrate in one converging optical system. This application is illustrated as follows. When reproducing information of a conventional second optical information medium (for example, CD), etc. with use of an optical pickup apparatus for a first optical information recording medium (for example, DVD), a laser source having wavelengths of 635 to 690 nm is employed which is shorter than 780 nm for the CD. Then, effective numerical aperture NA of an objective lens employed for reading becomes small (0.26 to 0.40) by that corresponding to the difference in the wavelength and reading is carried out using a light beam in this region, while employing a converging optical system for reproducing the DVD. Furthermore, explanation is detailed with reference to the drawings. FIGS. 12(A) and 12(B) illustrate converging optical systems of optical pickup apparatuses. FIG. 12(A) is an arrangement corresponding to a first optical information recording medium and FIG. 12(B) is an arrangement corresponding to a second optical information recording medium. In FIG. 12(A), a laser beam emitted from a laser source 12 is transformed to an approximately parallel beam through a collimator lens 32 and is confined to an intended beam at an aperture-stop 33. Then, the resulting beam is transmitted to an objective lens 31 described later. The laser beam transmitted to the objective lens 31 is converged on an information recording surface 53 through a transparent substrate 52 of a first optical information recording medium 51 (DVD). In the same way, in FIG. 12(B), a laser beam is converged on an information recording surface 56 through a transparent substrate 55 of a second optical information recording medium 54 (CD). In addition, the laser beam shown by broken lines contributes to effective reading.

FIGS. 13(A) and 13(B) are drawings of spherical aberration of the objective lenses shown in FIGS. 12(A) and 12(B). FIG. 13(A) is the spherical aberration of the objective lens through the first transparent substrate, and FIG. 13(B) is the spherical aberration of the objective lens through the second transparent substrate. This objective lens, when receiving a parallel beam, focuses a light spot having numerical aperture of NA1 on the information recording surface through the transparent substrate (thickness $t_1$) of the first optical information recording medium. Moreover, this objective lens makes excessive compensation for the aberration for the laser beam having numerical aperture of (½) NA2 as compared to the light beam having numerical aperture of NA2. Due to the above, wave front aberration is reduced in the range of NA2 when passing the laser beam through the transparent substrate having thickness of $t_2$.

Additionally, in such an optical pickup apparatus, is employed a detecting method for a focusing error signal, a tracking error signal, etc. with use of a light receiving element consisting of multi-divided regions as a photodetector.

Furthermore, (2) the other pickup apparatus is explained with reference to the drawings. FIGS. 14(A) and 14(B) are schematic diagrams of optical pickup apparatuses described in Japanese Patent Application No. 105463/1995 applied by the applicant of the present invention. FIG. 14(A) is an arrangement corresponding to a first optical information recording medium and FIG. 14(B) is an arrangement corresponding to a second optical information recording medium. In FIG. 14(A), a laser beam emitted from a laser source 12 is passed through a hologram beam splitter 34 and is transformed to an approximately parallel beam through a collimator lens 32 held by a frame 44 which is movable along the optical axis. The resulting parallel beam is confined to an intended beam at an aperture-stop 33, and then, is transmitted to an objective lens 31. The beam incident to the objective lens 31 is converged on an information recording surface 53 through a transparent substrate 52. The beam is modulated with an information pit on the information recording surface and reflected. The reflected beam returns to the hologram beam splitter 34 through both of the objective lens 31 and the collimator lens 32, and there, the beam is separated from a beam path of the laser source and is transmitted to a photodetector 13. The photodetector 13 is composed of a PIN photodiode consisting of multi-divided regions and each region outputs electric current proportional to the intensity of the incident beam. The electric current is transferred to a detecting circuit system, not shown, and an information signal, a focusing error signal and a tracking error signal are generated. A two-dimensional actuator, not shown, composed of a magnetic circuit, a coil, etc. controls the integrally installed objective lens 31 and aperture-stop 33 so that a light spot is always positioned on a information track. In FIG. 14(B), during reading information of a second optical information recording medium, a collimator lens 32 is transported to a specified position located at the side of the laser source in the optical axis direction and for the adjustment of numerical aperture NA, a second aperture-stop 43 is inserted to a light path using an aperture-stop component 42. As mentioned above, the collimator lens 32 is transported along the optical axis and the degree of divergence of the incident light to the objective lens is varied and the spherical aberration due to the difference in thickness of the substrate can be eliminated. It is possible to read information of the optical information recording medium having a substrate different in thickness. In addition, the aberration of the collimator lens 32 is mostly compensated when using a spherical surface on either side of the lens. As a result, the objective lens 31 can receive a parallel light having no aberration. In the same way, the spherical aberration of the objective lens 31 can be compensated to zero with use of an aspherical surface on either side of the lens. Moreover, with use of the aspherical surface on both sides of the lens, comatic aberration can be well compensated.

However, in the pickup apparatuses (FIGS. 12(A) and 12 (B)) described in the foregoing (1), it is necessary to minimize the spherical aberration of the objective lens 31 of the converging optical system and inhibit a detector-returning light which exceeds the limit of NA effective at reading information of the second optical information recording medium different in thickness.

Moreover, for the objective lens employed in this pickup apparatus, it is required to have less spherical aberration through a different transparent substrate of the optical information recording medium in one converging optical system and to be able to control the return of a noise light to the photodetector.

Furthermore, for the optical pickup apparatus described in the foregoing (1), it is required to carry better accuracy in detecting a focusing error signal, tracking error signal, etc., even via a transparent substrate different in thickness of the optical information recording medium in one converging optical system.

Furthermore, for the optical pickup apparatuses (FIGS. 14(A) and 14(B)) in the foregoing (2), it is required to have a shorter movement of the collimator lens, and to install no second aperture-stop, and to be more compact and lower in cost.

SUMMARY OF THE INVENTION

In view of the foregoing, an object of the present invention is to provide an optical pickup apparatus wherein information of an optical information recording medium having a transparent substrate different in thickness is recorded and/or reproduced with good accuracy in one converging optical system. Another object of the present invention is to provide an objective lens which can reproduce well information of an optical information recording medium having a transparent substrates different in thickness, which is used for the above-mentioned optical pickup apparatus. Still another object of the present invention is to provide an optical pickup apparatus having a photodetecting system with high accuracy for making it possible to record and/or reproduce information of an optical information recording medium having a transparent substrate different in thickness in one converging optical system. Further object of the present invention is to provide an optical pickup apparatus which can record and/or reproduce well information of an optical information recording medium having a transparent substrate different in thickness, while using less movement of a collimator lens.

The above-mentioned objects have been achieved by the following embodiments.

The above-mentioned objects are achieved by the following means, that is; an optical pickup apparatus wherein a laser beam emitted from a laser source passes through a transparent substrate and is converged as a light spot on an information recording surface of an optical information recording medium, which is characterized by comprising a converging optical system having at least one surface which enables spherical aberration to be discontinuous at numerical aperture NA3 which is more than numerical aperture NA2 and less than numerical aperture NA1 under the conditions of $t_1<t_2$ and NA1>NA2, wherein $t_1$ is the thickness of a first transparent substrate; $t_2$ is the thickness of a second transparent substrate; NA1 is the numerical aperture required for the optical information recording medium of the converging optical system for obtaining a light spot having one of wavelengths of the laser source for use in reading out information of the first optical information recording medium, and NA2 is the numerical aperture required for the optical information recording medium of the converging optical system for obtaining a light spot having one of wavelengths of a laser source for use in reading out information of the second optical information recording medium.

In addition, an objective lens for an optical pickup apparatus wherein a laser beam emitted from a laser source passes through a transparent substrate and is converged as a light spot on an information recording surface of an optical information recording medium and information is recorded and/or reproduced on the information recording surface, which is characterized by comprising at least one surface which enables spherical aberration to be discontinuous at numerical aperture NA3 which is more than numerical aperture NA2 and less than numerical aperture NA1 under the conditions of $t_1<t_2$ and NA1>NA2, wherein $t_1$ is the thickness of the first transparent substrate; $t_2$ is the thickness of the second transparent substrate; NA1 is the numerical aperture required for an optical information recording medium comprising the objective lens for obtaining a light spot having one of wavelengths of the laser source for use in reading out information of the first optical information recording medium, and NA2 is the numerical aperture required for the optical information recording medium comprising the objective lens for obtaining a light spot having one of wavelengths of the laser source for use in reading out information of the second optical information recording medium.

Furthermore, an optical pickup apparatus wherein in a converging optical system, a laser beam emitted from a laser source passes through a transparent substrate; is converged as a light spot on an information recording surface of an optical information recording medium; the beam reflected from the information recording surface is transmitted to a photodetector and information recorded on the information recording surface is read out, which is characterized by holding the optimized wave front aberration of 0.05λ rms or less of a light spot through the first transparent substrate having thickness of $t_1$ of the converging optical system under the conditions of the first transparent substrate having thickness of $t_1$ and numerical aperture of NA1 required for the optical information recording medium of the converging optical system which utilizes the light spot having one of wavelengths of the laser source for use in reading out information of the first optical information recording medium.

BRIEF DESCRIPTION OF THE DRAWINGS

FIGS. 2(B)-1 and 2(B)-2 are simulated spherical aberration diagrams.

FIGS. 6(A), 6(B) and 6(C) are simulated spherical aberration diagrams of the another objective lens.

FIGS. 7(A), 7(B) and 7(C) are simulated spherical aberration diagrams of the still another objective lens.

FIGS. 14(A) and 14(B) are schematic diagrams of the other optical pickup apparatuses.

DETAILED DESCRIPTION OF THE PREFERRED EMBODIMENT

In the following, embodiments of an optical pickup apparatus and an objective lens for the optical pickup apparatus are explained with reference to the drawings.
(Embodiment 1)

Figure 1:
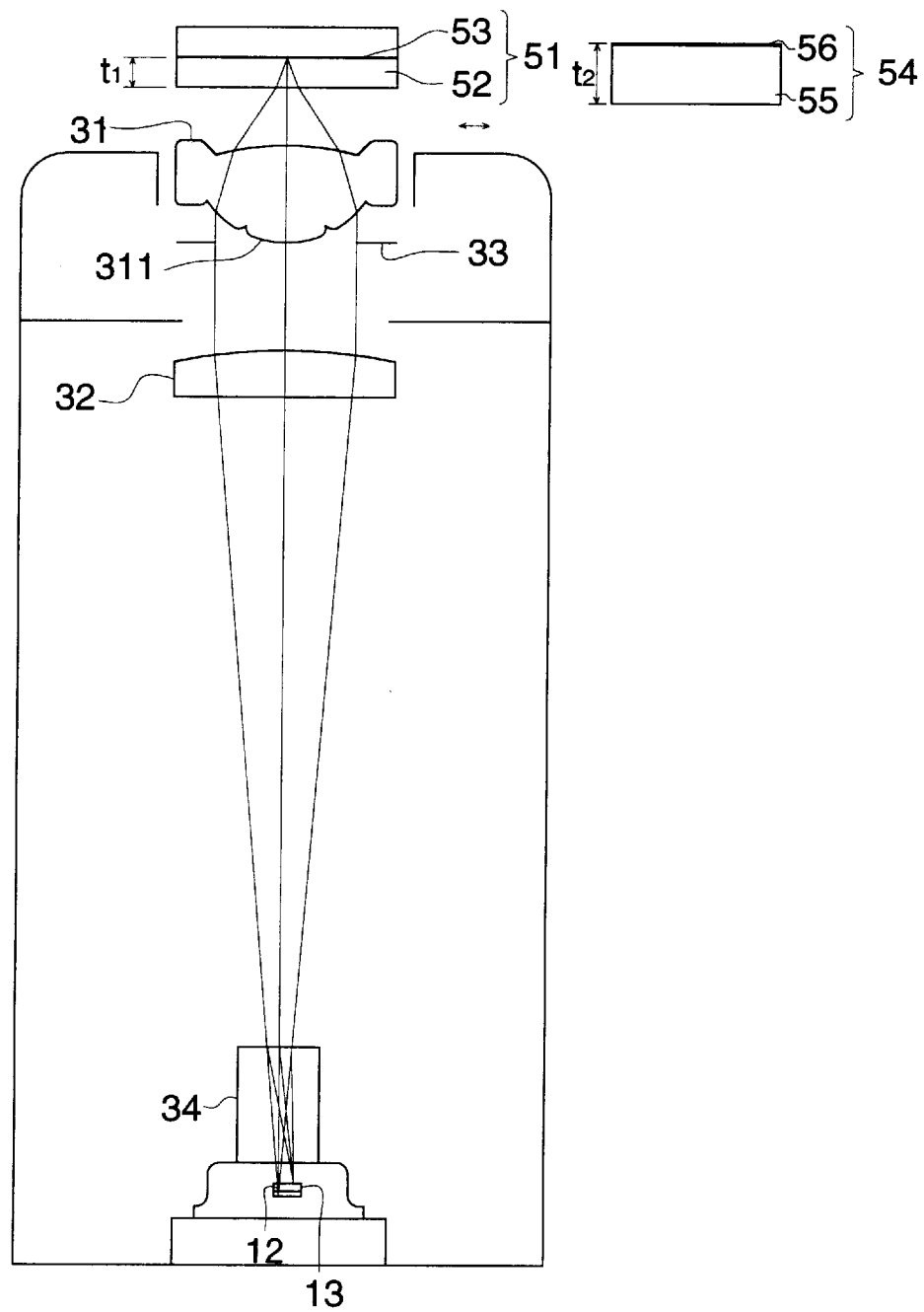
FIG. 1 is a schematic diagram of a main part of an optical pickup apparatus of the present invention.

FIG. 1 is a schematic diagram of a main part of an optical pickup of the present invention. In FIG. 1, a laser beam emitted from a laser source 12 is passed through a hologram beam splitter 34 and is changed into an approximately parallel beam through a collimator lens 32. The parallel beam is confined to an intended beam at an aperture-stop 33 and is transmitted to an objective lens 31 in which the spherical aberration is discontinuous at the 311 first surface in FIG. 2(A) described later. The laser beam incident to the objective lens 31 is converged on an information recording surface 53 through a transparent substrate 52 of a first optical information recording medium 51. Then, the laser beam is modulated with an information pit on the information recording surface 53 and is reflected. The reflected beam returns to the hologram beam splitter 34 via the objective lens 31 and the collimator lens 32, and there, is separated from a light path of the laser source 12 and is transmitted to a photodetector 13. The photodetector is composed of a PIN photodiode consisting of multi-divided regions and each region outputs electric current proportional to the intensity of an incident light. The electric current is transferred to a detecting circuit system, not shown, and thereby an information signal, a focusing error signal and a tracking error signal are generated. In accordance with the focusing error signal and the tracking error signal, a two-dimensional actuator (not shown) controls the integrally installed objective lens 31 and aperture-stop 33 in the focusing direction and the tracking direction so that a light spot is always positioned on an information track.

When wavelength $\lambda$ of the above-mentioned laser source is 635 nm, numerical aperture NA1 required for reading information of the first optical information recording medium 51 is 0.56. When the numerical aperture is larger (for example, 0.58) than the above value, reading can be well performed. Though wave front aberration regarded as criteria for diffraction limit is within $0.07\lambda$ rms (Marechal criterion), at reading information of the first optical information recording medium (DVD), it is desirable to make the wave front aberration within $0.05\lambda$ rms because of high density in information recording.

In case of the second optical information recording medium (CD), good reading properties are obtained when a ratio of numerical aperture to wavelength holds an equation of $\lambda/NA=1.75$ ($\mu$m). When the wavelength $\lambda$ of the laser beam is 780 nm, the numerical aperture NA2 is 0.45. When the wavelength of the laser beam is 635 nm, the numerical aperture NA2 is 0.36.

Furthermore, with use of an equalizer in a signal processing system, by enabling a ratio of a spot size to an information recording line density to be nearly the same level as for the first optical information recording medium (DVD), it is also possible to reproduce information by making NA required for reading smaller. In this case, the numerical aperture NA2 is $\lambda$ ($\mu$m)/2.46 ($\mu$m). In case the wavelength of the laser beam is 635 nm, about 0.26 of the numerical aperture NA2 is available.

Then, when reproducing information of the second optical information recording medium 54 within the range of numerical aperture NA3 same as NA2 or more, for converging well a light spot even for the increase in the thickness of the transparent substrate 55, aberration characteristics are provided to the converging optical system so that an amount of light which returns to the photodetector 13 can be reduced for the region exceeding the NA3.

For the foregoing, it is possible to make spherical aberration of an emitted laser beam discontinuous by providing specified characteristics onto the aperture of optical components (beam splitter, collimator lens, objective lens), corresponding to this numerical aperture NA3. In practice, a surface structure is easily applied. An objective lens is preferably applied because the converging properties are kept unchanged against a shift of the objective lens due to tracking. In order to enable an optical pickup apparatus to reproduce information of CD-R in addition to DVD and CD, a laser source for long wavelengths ($\lambda$=770 to 830 nm) is installed together with a laser source for short wavelengths ($\lambda$=635 to 690 nm) in the pickup apparatus shown in FIG. 1. The reproduction for the DVD is carried out using the laser source having the short wavelengths and the reproduction for the CD-R is carried out using the laser source having long wavelengths. In this case, numerical aperture NA3 becomes NA 0.45 or more for $\lambda$=780 nm. The reproduction for the CD is carried out using either laser source.
(Embodiment 2)

Figure 2A:
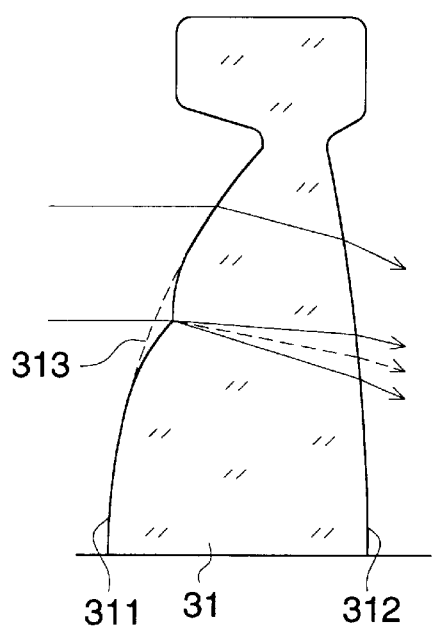
FIG. 2(A) is a simulated optical axial section of an objective lens.
Figures 1, 2, 2B:
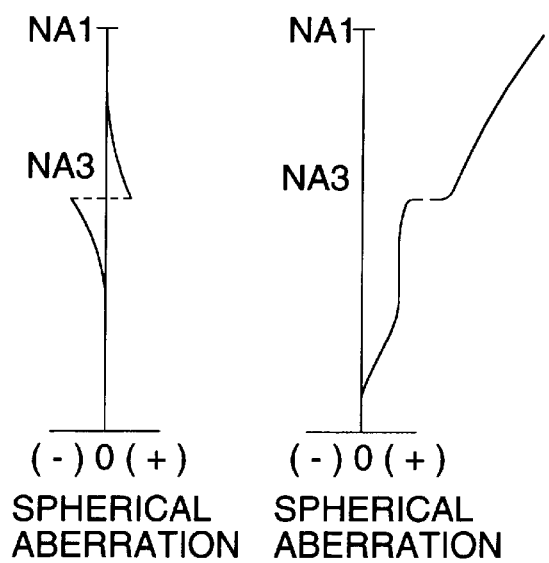
Figure 2C:
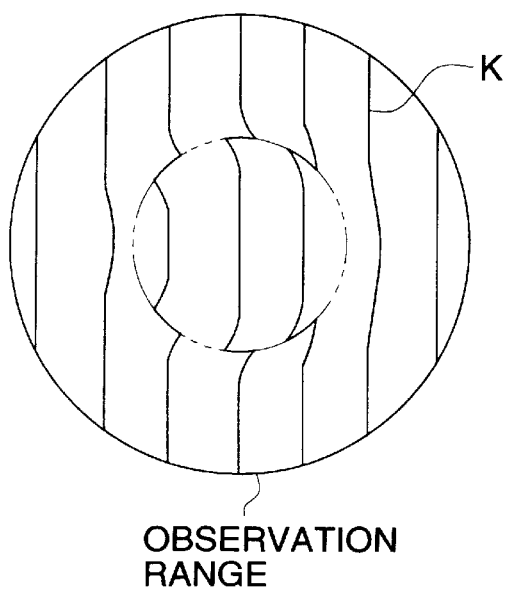
FIGS. 2(C) and 2(D) show simulated interference fringes.

Referring to the drawings, the objective lens for the converging optical system of the present invention is explained. At the same time, the principle is also explained. FIG. 2(A) is a simulated optical axial section. FIGS. 2(B) and 2(C) are a simulated spherical aberration diagram and a simulated interference fringe, respectively. In FIG., 2(A), an objective lens 31 is composed of a first light entering surface 311 and a second light emitting surface 312. The first surface 311 carries a recess. An ideal surface 313 shown by a broken line illustrates the ideal surface wherein no spherical aberration is caused through the optical information recording medium having a transparent substrate with thickness of $t_1$. The first surface 311 has a steep slope up to the height of NA3 than that of the ideal surface and a more slow slope higher than NA3. FIG. 2(B)-1 is a simulated spherical aberration diagram via a first optical information recording medium 51. A region from the axis to NA3 is an effective light beam for reading information of the second optical information recording medium. At the numerical aperture NA3, the spherical aberration becomes discontinuous. Excessive spherical aberration caused by the increase in thickness of the transparent substrate of the second optical information recording medium is reduced by decreasing the spherical aberration in the region having numerical aperture NA3 or less. As a result, a light spot is well focused and the quality of information reproduction is improved. FIG. 2(B)-2 is a simulated spherical aberration diagram via the second transparent substrate and shows that the aberration of NA3 or more has an excessive trend. A light beam in the region outside of NA3 makes no contribution to reading but becomes a noise component. For the light beam, a portion near NA1 has extremely large spherical aberration. On account of the large aberration, it is defocused from the information reading surface to result in no factor for noise. However, the portion near NA3 results in a flare adjacent to the light beam effective for reading, and when transmitted to the photodetector, causes big noise and suffers jitter degradation. By making a definite aperture region in the outside of NA3 an excessive direction for the spherical aberration, it is possible that the light beam which runs in the region does not return to the photodetector. As a result, noise can be reduced. Moreover, in a convex surface of the objective lens, radius of curvature is large for a lower aperture side against the ideal shape and the radius of curvature becomes more gentle for the higher aperture side. In a concave surface, the situation is reversed.

In order to manufacture such an objective lens, a die is prepared according to specifications on the shape and the objective lens is manufactured by molding plastic materials and glass materials using the die. Molding is performed in the same manner as in the conventional objective lens.

Evaluation on the objective lens can be made by, for example, measuring an interference fringe using an interferometer. When wave front having wave front aberration (spherical aberration component) is measured by the interferometer, a variety of interference fringes are observed depending on kinds of interferometers, defocusing, and degree of tilting. However, it is possible to evaluate the objective lens. The details are described in "Optical Shop Testing", John Wiley & Sons Inc. In addition, when using the Sharing interferometer, it is possible to observe the wave front of emitted light from the optical pickup apparatus. As this kind of interferometer, Mark IV, Model 8100 manufactured by ZYGO Co. is commercially available.

Relationship between longitudinal aberration on an axis and wave front aberration is described, for example, in Kusakawa, "Wave Front Optics", page 9 as follows. When relationship between the longitudinal aberration on the axis (spherical aberration) $\Delta s$ and W is obtained, relationship between $\Delta s$ and lateral aberration is expressed by the following Equation 1.

$$y = \frac{\Delta s}{R + \Delta s} \eta = \frac{\Delta s}{R} \eta = \frac{1}{2F_0} \Delta s \cdot \eta_N \quad \text{[Equation 1]}$$

Accordingly, the following Equation 2 is obtained.

$$W(h) = \frac{1}{4F_0^2} \int_0^h (\Delta s) h \, dh \quad \text{[Equation 2]}$$

As $\Delta s$, when Seidel aberration of $\Delta s = ph^2$ is taken into account, $W(h) = ph^4/64$ is obtained. In this manner, it is possible to obtain the longitudinal aberration by extracting an axial symmetry component through the analysis of the interference fringe.

Figure 2D:
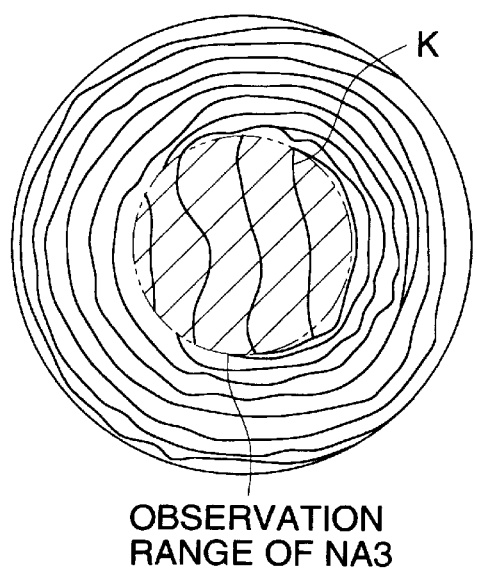

FIG. 2(C) shows a simulated interference fringe K of longitudinal aberration. At the objective lens 31, by providing tilt to between a light beam which passes through an optical information recording medium having thickness of $t_1$ or which passes a substrate equivalent to the above and ideal spherical reference wave, a fringe illustrated by parallel lines at regular intervals is curved and the phase shifts in the inside and the outside. As a result, wave front curved in a letter V-shape due to reversed delay is observed. When the phase shifts by $2n\pi(n=\pm1, \pm2, \ldots)$ in the inside and the outside, the wave front aberration increases in terms of calculation result. However, substantial converging characteristics are maintained. In this case, the wave front aberration is calculated, neglecting an integer component of this phase jump and the resulting value of $0.07\lambda$ rms or preferable $0.05\lambda$ rms is acceptable. When obtaining the wave front aberration via the second transparent substrate having thickness of $t_2$, the aberration is calculated within the range of the region of a discontinuous portion of interference fringe corresponding to numerical aperture NA3. Namely, in FIG. 2(D), the inside region of the hatching lines is for observing the best fit wave front aberration. Furthermore, in FIG. 2(C), all regions become the region for observing the best fit wave front aberration.

(Embodiment 3)

Figure 3:
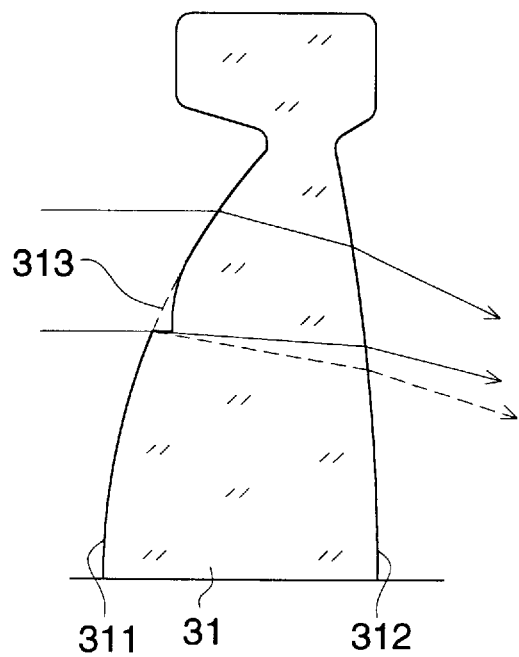
FIG. 3(A) is a simulated optical axial section of the other objective lens.
FIG. 3(B) is a simulated spherical aberration diagram via thickness $t_1$.
FIG. 3(C) is a simulated interference fringe.
Figure 3:
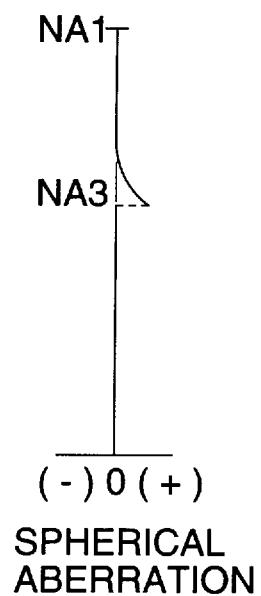
Figure 3:
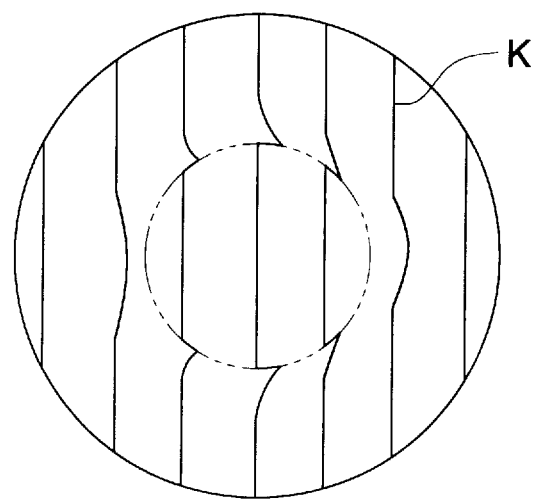

Referring to plural examples in the following, the other objective lenses are explained. The same parts as those of the objective lenses in FIGS. 2(A) to 2(C) are termed by the same numerals. The explanation is abbreviated for ones with no change in arrangement and functions. FIG. 3(A) is a simulated optical axial section. FIG. 3(B) is spherical aberration via thickness $t_1$. FIG. 3(C) is a simulated interference fringe. At the height of numerical aperture NA3 of the first surface 311 of the objective lens 31, there is a discontinuous portion of the spherical aberration as illustrated. The surface shown by a broken line is the ideal surface 313 wherein the spherical aberration becomes zero via the transparent substrate having thickness of $t_1$ of the first optical information recording medium. In this case, a simulated interference fringe becomes as shown in FIG. 3(C).

When a value of NA3 is small, for example, such as 0.3, or a difference in thickness between the first optical information recording medium and the second optical information recording medium is small such that $t_1=0.6$ mm and $t_2$ is 0.8 mm wherein $t_1$ is the thickness of the first optical information recording medium and $t_2$ is the thickness of the second optical information recording medium, in the range of NA3, the best fit wave front aberration via a transparent substrate having thickness of $t_2$ of the second optical information recording medium can be adjusted within $0.07\lambda$ rms even in case via the transparent substrate with thickness of $t_1$, spherical aberration is perfectly compensated. In this case, when a light beam in the outside region adjacent to NA3 returns to the photodetector, noise increases at the time of detecting an information signal, and the linear range of a focusing error signal becomes narrow. In the present embodiment, it is arranged so that the spherical aberration in a definite aperture region in the outside of NA3 remains in the excessive-corrected direction. On account of this, the return of the light beam in this region to the photodetector can be reduced.

Figure 4:
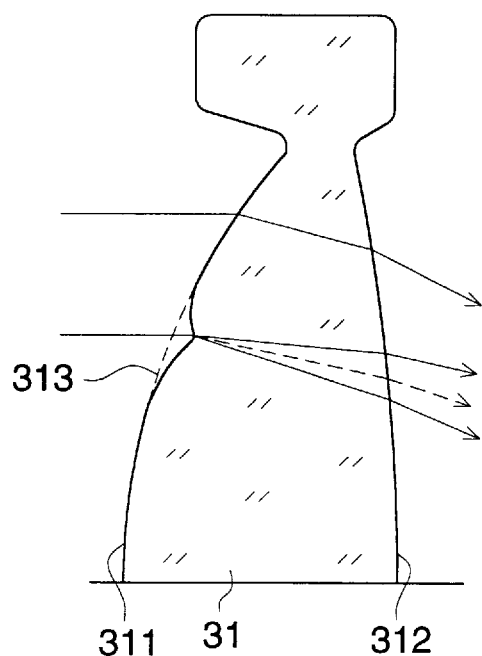
FIG. 4(A) is a simulated optical axial section of the other objective lens.
FIG. 4(B) is a simulated spherical aberration diagram via thickness $t_1$.
FIG. 4(C) is a simulated interference fringe.
Figure 4:
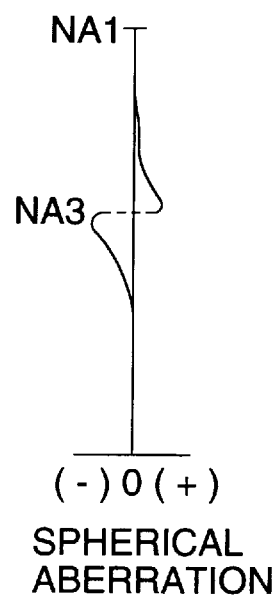
Figure 4:
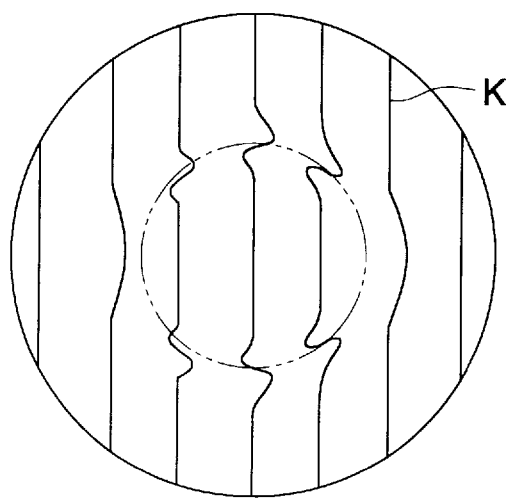

Additionally, in FIGS. 4(A) to 4(C) for the other objective lens, FIG. 4(A) is a simulated optical axial section; FIG. 4(B) is a simulated spherical aberration and FIG. 4(C) is a simulated interference fringe. As shown, the objective lens 31 has a discontinuous portion on the gently curved line of the spherical aberration at the height of the numerical aperture NA3 of the first surface 311. In this case, the simulated interference fringe becomes as shown in FIG. 4(C). In this way, a slow radius of curvature of the edge of cutting tool to cut a die for lens surface can be used.

Figure 5:
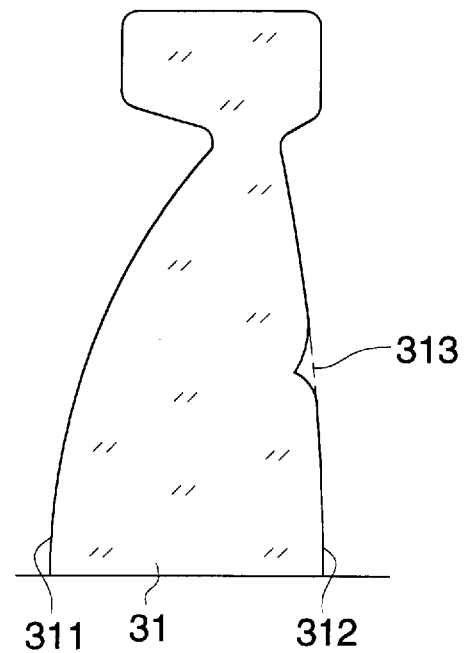
FIGS. 5(A) and 5(B) are simulated optical axial sections of the other objective lens.
Figure 5:
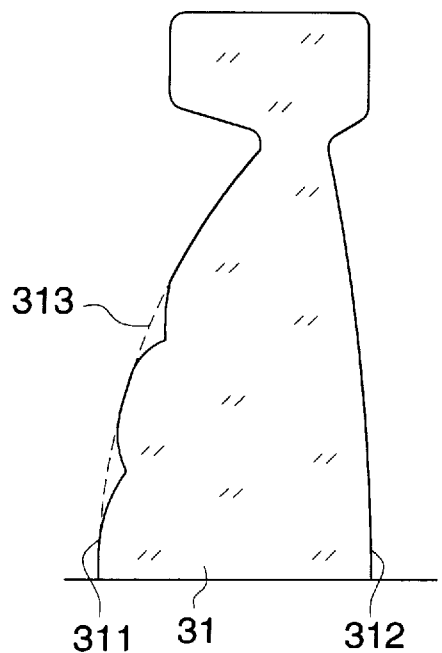

Additionally, FIGS. 5(A) and 5(B) are simulated optical axial sections of the objective lenses. The objective lens 31 shown in FIG. 5(A) has the first surface 311 and the second surface 312, and a discontinuous portion is arranged on the second surface 312. Even in this embodiment, the same aberration as in the objective lens of FIGS. 2(A) to 2(C) can be provided by making a recess at the position corresponding to the light beam of NA3 due to concave of the second surface. FIG. 5(B) shows that two discontinuous portions are arranged on the surface 311 of the objective lens 31. This can be applied to information reading from an optical information recording medium having three transparent substrates different in thickness.

Furthermore, FIGS. 6(A) to 6(C) are simulated spherical aberration diagrams of the other objective lens. In FIGS. 6(A) to 6(C), three types of spherical aberration via the first transparent substrate are illustrated. Each numerical aperture is NA3 and discontinuous spherical aberration curves are obtained as shown in the figures. FIG. 6(A) shows the same spherical aberration as that of the objective lens in FIGS. 2(A) to 2(D). FIGS. 6(B) and 6(C) show the spherical aberration compensated with a different manner within the range of NA3. Both types of spherical aberration of a light beam having ½ of NA3 when excessively compensated as compared to the light beam of NA3 and when the second transparent substrate is used, a light spot is well focused. The present invention is not limited to those curves. In case of a large value of NA3, for example, such as 0.45, when the outside region from NA3 is taken as an excessive direction, the wave front aberration via the first information recording medium increases and the converging characteristics decrease. However, due to the increase in NA3, originally the aberration for the excessive direction has been large and the return of a light beam in this region to the photodetector has been decreased. In such a case, it is preferred that the spherical aberration remains only within the region of NA3 as shown in FIGS. 7(A) to 7(C). An embodiment of the objective lens shown in the aberration diagram in FIG. 7(B) is described in the following.

EXAMPLE

As a representative embodiment of the present invention, is explained an optical system which records and/or reproduces information of an optical information recording medium composed of an infinite conjugated type objective lens which converges a parallel beam on an information recording surface and the parallel beam is prepared by transmitting a divergent laser beam emitted from a laser source to a collimator lens which transform approximately the beam to the parallel.

Firstly, abbreviations used herein are as follows.

Surface number of optical system: s

Radius of curvature of each optical surface: r

Thickness or distance between optical surfaces: d, d'

Refractive index of each optical medium: n

Furthermore, Equation 1 shows a formula for an aspherical surface when an aspherical surface is used for a lens or optical surface.

$$x = (H^2/r)/[1 + \sqrt{1-(1+K)(H/r)^2}\,] + \sum_i A_j h^{p_j} \quad \text{[Equation 3]}$$

Wherein X represents the axis in the axial direction; H represents the axis perpendicular to the optical axis; light progression direction is positive; in addition, r is the paraxial radius of curvature; K represents the conical coefficient; Aj represents the aspherical surface coefficient and Pj represents the exponent of the aspherical surface coefficient. And f=3.36 mm, λ=635 nm, NA1=0.60, NA3=0.37. The best fit wave front aberration at NA1 through a substrate having thickness of 0.6 mm is 0.05λ rms and the best fit wave front aberration at NA3 through a substrate having thickness of 1,2 mm is 0.01λ rms.

Numerical data of the Embodiment

The numerical data of the Example are shown in Table 1 and Table 2, respectively.

TABLE 1

| s | r | d (for DVD) | d' (for CD) | n (DVD/CD) |
|---|---|---|---|---|
| 0 (Aperture-stop) | | 0.0 | 0.0 | 1.0 |
| 1 (Objective lens) | 2.059 | 2.6 | 2.6 | 1.4981 |
| 2 | −5.194 | 1.57 | 1.19 | 1.0 |
| 3 | ∞ | 0.6 | 1.2 | 1.58 |
| 4 (Substrate) | ∞ | | | |

TABLE 2

| | | |
|---|---|---|
| First surface aspherical coefficient | 0 < H < 1.23 | |
| | K = −0.55472 | |
| | A1 = +0.53430E−03 | P1 = 4.0 |
| | A2 = +0.38600E−04 | P2 = 6.0 |
| | A3 = −0.91250E−05 | P3 = 8.0 |
| | A4 = −0.95255E−05 | P4 = 10.0 |
| | 1.23 < H < 2.02 | |
| | K = −0.55472 | |
| | A1 = +0.53430E−03 | P1 = 4.0 |
| | A2 = −0.76687E−04 | P2 = 6.0 |
| | A3 = −0.91250E−05 | P3 = 8.0 |
| | A4 = −0.95255E−05 | P4 = 10.0 |
| Second surface aspherical coefficient | K = −0.17106E+02 | |
| | A1 = +0.12343E−01 | P1 = 3.0 |
| | A2 = −0.27949E−01 | P2 = 4.0 |
| | A3 = +0.48412E−01 | P3 = 5.0 |
| | A4 = −0.28682E−01 | P4 = 6.0 |
| | A5 = +0.39817E−02 | P5 = 8.0 |
| | A6 = −0.34496E−03 | P6 = 10.0 |

(Embodiment 4)

Figure 8:
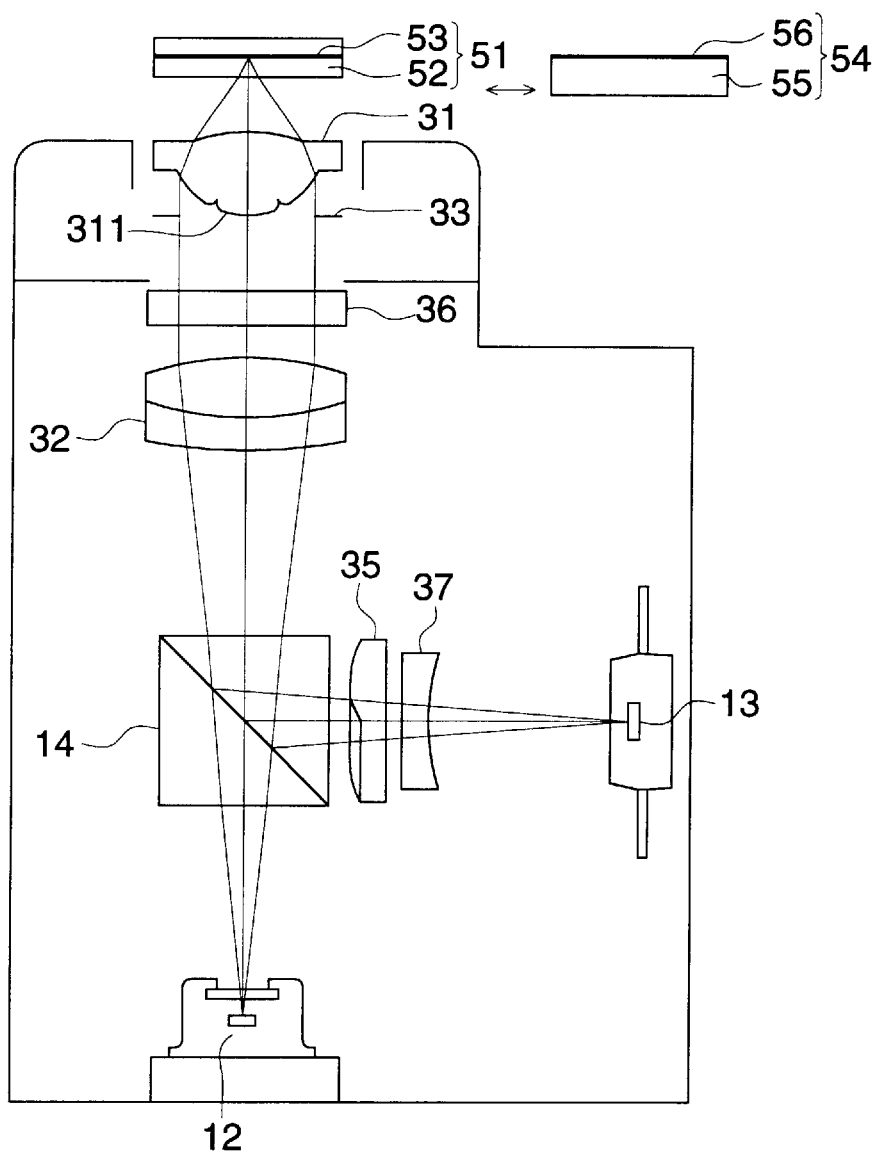
FIG. 8 is a schematic diagram of a main part of the other pickup apparatus of the present invention.
Figure 9:
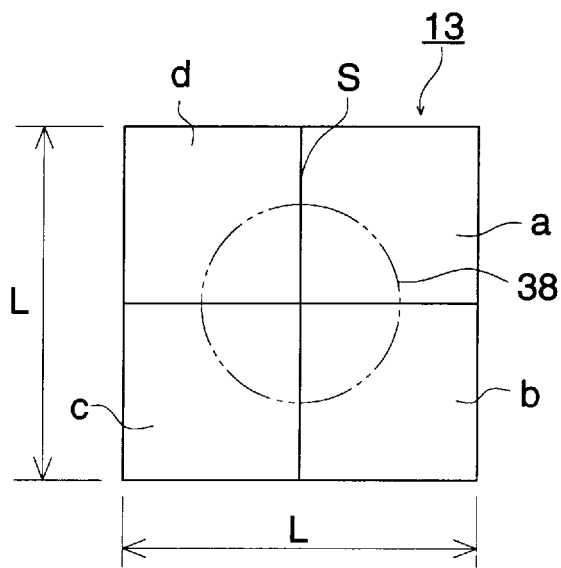
FIG. 9 is a block diagram of a photodetector in FIG. 8.
Figure 10:
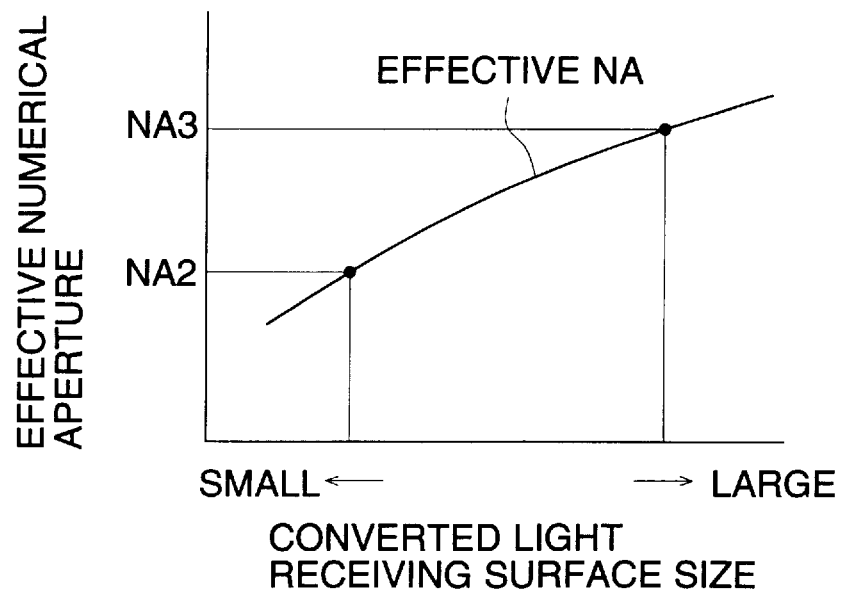
FIG. 10 is an explanatory diagram on effective numerical aperture.

In the following, referring to the drawings, an optical pickup apparatus of the present invention is explained. FIG. 8 is a schematic diagram of a main part of the other pickup apparatus of the present invention; FIG. 9 is a schematic diagram of the photodetector in FIG. 8 and moreover, FIG. 10 is an explanatory drawing of effective numerical aperture. Moreover, the objective lens 31 in this example is the same as explained in the embodiment 2.

In FIG. 8, a laser beam having a wavelength of 680 nm emitted from a laser source 12 is passed through a polarized beam splitter 14, a collimator lens 32 and a quarter wave plate 36 is transformed into a circularly polarized parallel beam. The resulting parallel beam is, then, converged on an information recording surface 53 by an objective lens 31 through a transparent substrate 52 of a first optical information recording medium 51. The beam is, then, modulated by an information pit on the information recording surface and reflected. The reflected beam passes again through the objective lens 31, the quarter wave plate 35 and the collimator lens 32 and is transmitted to the polarized beam splitter 14. The beam is provided with astigmatism by a cylindrical lens 35 installed in a light path and is magnified by a concave lens 37 of which initial position can be adjusted in the optical axial direction. The magnified beam is directed to a photodetector 13 described later. The photodetector 13 is composed of a PIN photodiode consisting of multi-divided regions and outputs electric current proportional to the intensity of an incident light. The electric current is transferred to a detecting circuit system, not shown. There, an information signal (FES), a focusing error signal (FES) and a tracking error signal (TES) are generated. In accordance with the focusing error signal and the tracking error signal, a two-dimensional actuator (not shown) composed of a magnetic circuit, a coil, etc. controls the objective lens in the focusing and tracking directions so that a light spot is always positioned on an information track.

Referring to FIG. 9, the above-described photodetector 13 is explained here. The photodetector 13 is composed of a light receiving element consisting of 4 regions. The length of one side of the light receiving element is L. In the photodetector 13, the element consisting of the light receiving regions of a to d receives a light spot. A dividing line S of the photodetector 13 is arranged to the direction of about 45° against the generatrix of a cylindrical lens 35. The focusing error signal is generated by an astigmatism method wherein (a+c)−(b+d) is computed. The tracking error signal is generated by, for example, a push-pull method wherein (a+b)−(c+d) is computed and a phase difference detecting method, wherein (a+c)−(b+d) is computed. Further, information signal is computed by (a+b+c+d). These detection methods are well known and no detailed explanation is given. Furthermore, at $\lambda=680$ nm wherein $\lambda$ represents the wavelength of the light source of the present embodiment, the numerical aperture NA1 required for reading information of the first optical information recording medium (DVD) is 0.60 and the numerical aperture required for reading information of the second optical information recording medium (CD) is 0.39.

The position of a concave lens is positioned in the optical axial direction so that in the first optical information recording medium (DVD), the detection of an information signal is maximized and the initial adjustment is carried out so that a circular light spot is formed at the center of the 4-divided detector. The focusing control is carried out by the objective lens using an actuator so that the output from the light receiving region consisting of a to d holds (a+c)−(b+d)=0.

Figure 13:
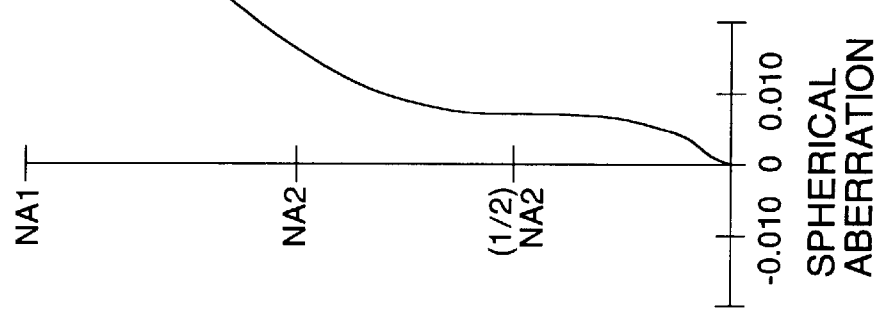
FIGS. 13(A) and 13(B) are spherical aberration diagrams of objective lenses in FIGS. 12(A) and 12(B).
Figure 13:
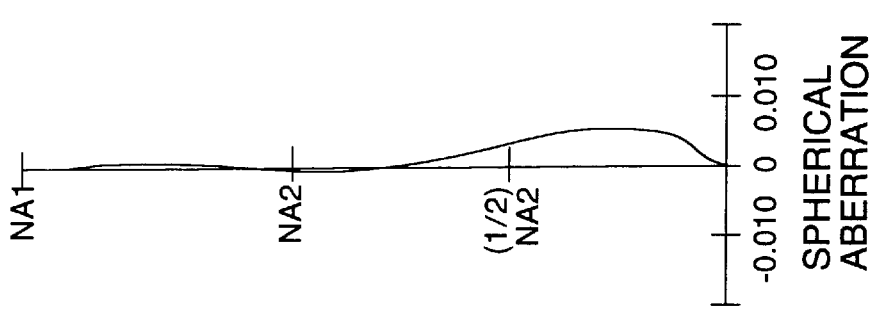

In this way, when information of the second optical information recording medium (CD) is reproduced under the state such that the optimum adjustment has been made for the first optical information recording medium (DVD), it is required that a zero point of the focusing error signal (FES) detected by the 4-divided photodetector corresponds to a defocusing point of the reading spot on the information recording surface in the range suitable for reading. Accordingly, when the position of the objective lens 31 is controlled so that FES=0 is held wherein FES represents the focusing error signal, it is required that effective NA, described later in FIG. 10, is NA2 or larger and NA3 or less, which provides a best fit wave front aberration at the above-described defocusing point. When an objective lens having the spherical aberration shown in FIG. 13 which is proposed in Japanese Patent Application No. 21225/1986 is employed, it is required that the effective NA is NA2 or more in which the wave front aberration is $0.07\lambda$ rms or less. This defocusing point varies in accordance with a magnification ratio of the converging optical system from the objective lens to the photodetector and a size of the photodetector.

Furthermore, referring to FIG. 10, the above-mentioned effective numerical aperture is explained. In FIG. 10, the abscissa represents the size of converted light receiving surface and the ordinate represents the effective numerical aperture. The size of the converted light receiving surface= size of light receiving element for detecting signal/ (magnification between information recording surface and photodetector)

For example, when the length of one side of the photodetector 13 is 150 $\mu$m (150 $\mu$m is the total length of four light receiving regions having side length of 75 $\mu$m); focusing length of the objective lens is 3.17 mm and composite focal length of the collimator lens, cylindrical lens and concave lens is 31.7 mm, the magnification ratio between the information recording surface and the photodetector is 10 times and the size of the converted light receiving surface becomes 15 $\mu$m. The larger the size of the converted light receiving surface becomes, the larger the effective numerical aperture at a focusing point controlled by focusing becomes. In the range within the numerical aperture NA3 wave front aberration of $0.07\lambda$ rms, 18 $\mu$m is equivalent to the above in terms of the size of the converted light receiving surface. When this effective numerical aperture increases, an amplitude of reproducing the information signal increases and resolving power is improved. When it becomes larger than this, jitter degradation is caused due to the degradation of a spot size on account of the increase in the wave front aberration and noise increases due to a flare light. In addition, the focusing error signal FES becomes narrow and the stability of a focusing control decreases. On the contrary, when the size of the converted light receiving area decreases, the effective numerical aperture at a defocusing point controlled by defocusing decreases. In addition, noise due to a flare light decreases; a linear range of the focusing error signal FES increases and the stability of the focusing control is improved. A corresponding size of the converted light receiving surface is about 6 $\mu$m. When the value becomes less than that, the amplitude of the reproducing information signal decreases and the resolving power decreases. Moreover, in addition to a square, a rectangular or circle may be available as a shape of light receiving portion of the photodetector. In this case, the length of a side line of the square having the same area as that of the rectangular or circle is regarded as the side length of the rectangular or circle, respectively.

(Embodiment 5)

Figure 11:
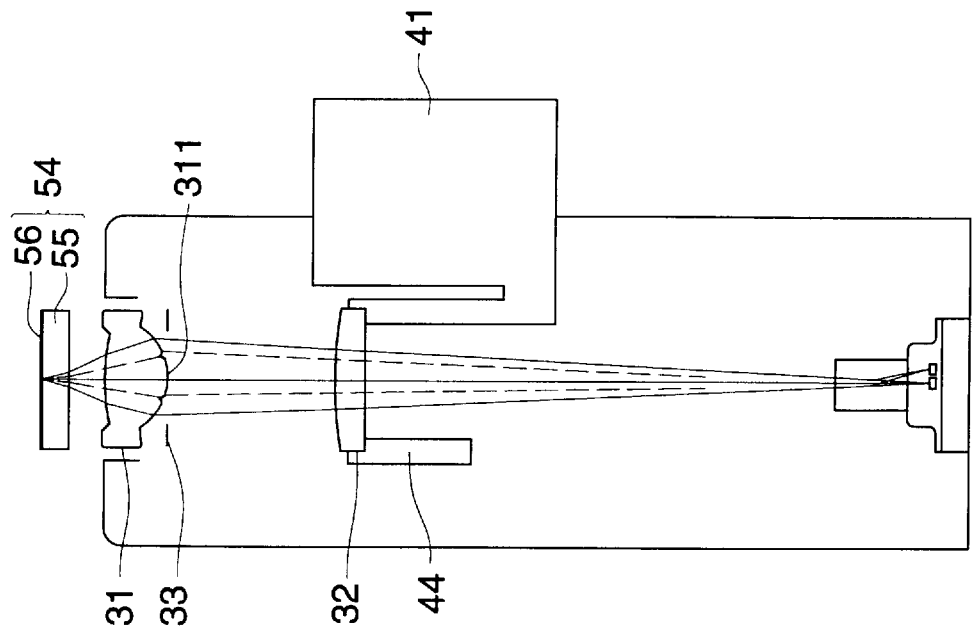
FIGS. 11(A) and 11(B) are schematic diagrams of main parts of the other optical pickup apparatuses.
Figure 11:
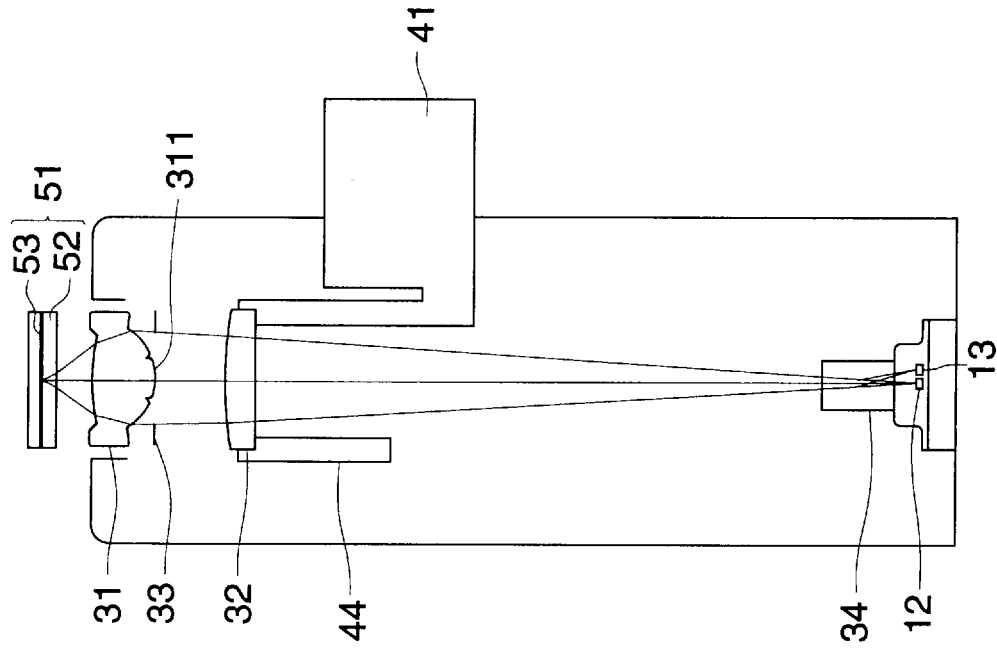
Figures 12A, 12B:
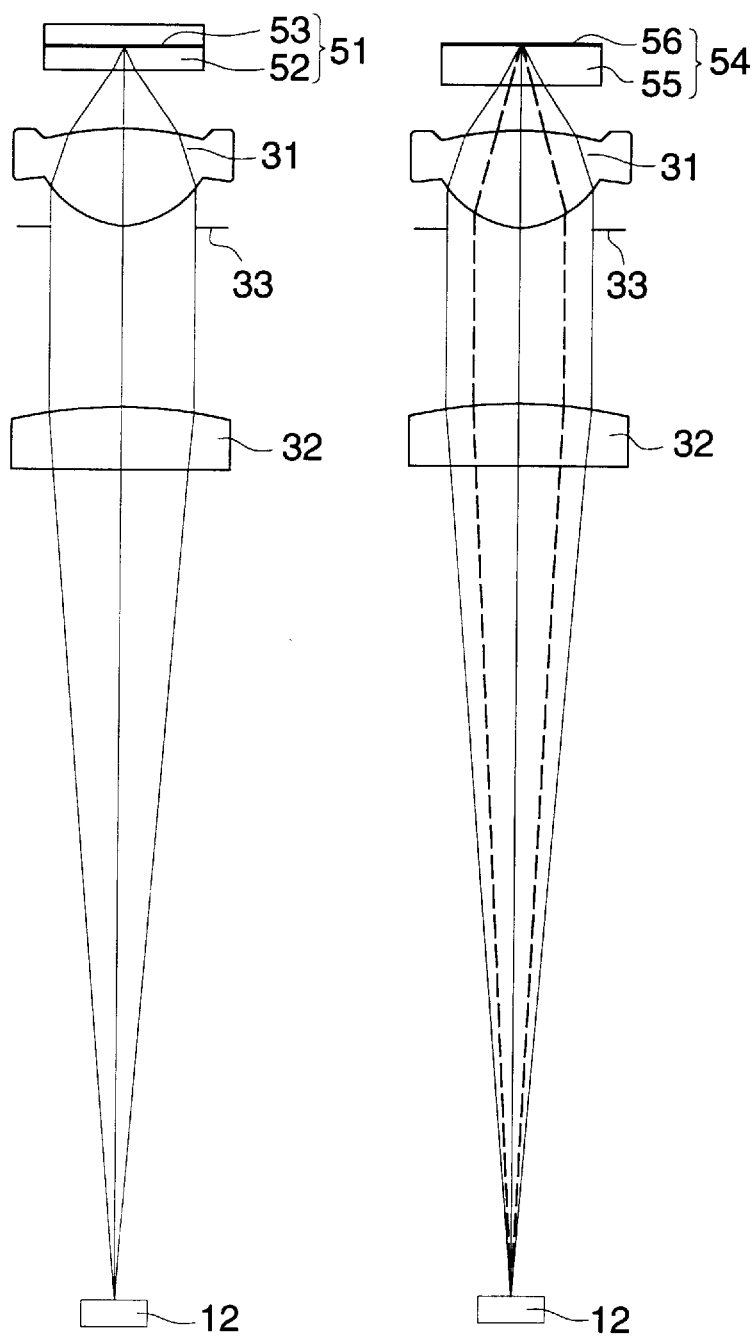
FIGS. 12(A) and 12(B) are diagrams illustrating converging optical systems of optical pickup apparatuses.

Referring to the drawings, an optical pickup apparatus is explained. FIGS. 11(A) and 11(B) are schematic diagrams of main parts of optical pickup apparatuses. In more detail, FIG. 11(A) is an arrangement corresponding to a transparent substrate having thickness of $t_1$ of a first optical information recording medium and FIG. 11(B) is an arrangement corresponding to a transparent substrate having thickness of $t_2$ of a second optical information recording medium. The same numerals are used for the same as in FIGS. 14(A) and 14(B) showing in terms of function and mechanism. In FIGS. 11(A) and 11(B), a laser beam emitted from a laser source 12 is passed through a hologram beam splitter 34 and is transformed into an approximately parallel beam by a collimator lens 32 held by a movable frame 44 in the optical axial direction. The resulting parallel beam is confined to an intended beam by an aperture-stop 33 and is transmitted to an objective lens 31. The beam incident to the objective lens 31 is converged by the objective lens 31 and is converged on an information recording surface 53 through a transparent substrate 52 of a first optical information recording medium. On the information recording surface 53, the laser beam is modulated by an information pit and reflected. The reflected beam returns to the hologram beam splitter 34 through the objective lens 31 and the collimator lens 32; is separated from an optical path of the laser source 12 and is transmitted to a photodetector 13. The photodetector 13 is composed of a PIN photodiode consisting of multi-divided regions and each region outputs electric current proportional to the intensity of an incident light. The electric current is transferred to a detecting circuit system, not shown, and there, an information signal, a focusing error signal and a tracking error signal are generated. In accordance with the focusing error signal and the tracking error signal, a two-dimensional actuator, not shown, controls the integrally installed objective lens 31 so that a light spot is always positioned on an information track. Moreover, a lens transporting mechanism 41 is arranged in such a way that the frame 44 holding the collimator lens 32 is mechanically fixed by a two-point push ending using a motor.

When a transparent substrate having thickness of $t_1$ is placed in the above-described converging optical system, it is possible to reproduce information from the second optical information recording medium without any change by providing excessive compensation for spherical aberration to a laser beam having the ½ height of numerical aperture NA2 rather than numerical aperture NA2. Moreover, as shown in FIG 11(B), the collimator lens 32 is transported to a specified position at the side of the laser source in the optical axial direction; spherical aberration due to the difference in thickness of a transparent substrate is eliminated by making a laser beam incident to the objective lens divergent; a light spot is improved even for a larger diameter. Writing is carried out on the optical information recording medium having thickness of $t_2$. As compared to the CD, with high recording density, for example, such as an MO method, information of the optical information medium can be reproduced. Furthermore, the transporting length of the collimator lens 32 can be reduced by aberration given in advance.

Furthermore, as this converging optical system, for an aperture of NA3 having numerical aperture NA2 or more via a transparent substrate having thickness of $t_1$, the spherical aberration is made to be discontinuous; when reading information of the second optical information recording medium, the collimator lens 32 is transported to a specified position at the side of the laser source in the optical axial direction using a lens transporting mechanism 41 and by making the laser beam incident to the objective lens a divergent beam, the spherical aberration due to the difference in thickness of the transparent substrate is more preferably compensated. The laser beam in the outside of the discontinuous point of the aberration provided in advance carries the reverse directed aberration of the laser beam in the inside and an aperture-stop effect is obtained.

As mentioned above, with use of the optical pickup apparatus of the present invention, the apparatus structure is simplified in such a way that it is possible to make transporting length of the collimator lens 32 shorter than that shown in FIGS. 14(A) and 14(B) and to eliminate the second aperture-stop (aperture-stop 43 in FIGS. 14(A) and 14(B)) installed for reproducing information of the second optical information recording medium. Furthermore, the same effect is obtained by transporting a laser source instead of the collimator lens.

As embodied above, the following advantages are obtained.

The optical pickup apparatus of the present invention enables the optical pickup apparatus which can record and/or reproduce accurately information of an optical information recording medium having a transparent substrate different in thickness in one converging optical system by the installation of the surface which provides discontinuous spherical aberration.

The objective lens for the optical pickup of the present invention enables the objective lens for the optical pickup which is best suited to the high-precision optical pickup apparatus of the present invention as mentioned above.

The optical pickup apparatus of the present invention enables the optical pickup apparatus which can record and/or reproduce accurately information of an optical information recording medium having a transparent substrate different in thickness in one converging optical system wherein a size of the multi-divided light receiving element and the magnification ratio between the information recording surface and the photodetector are optimized and the detection of the focusing error signal and the tracking error signal is improved.

Additionally, the optical pickup apparatus of the present invention enables the optical pickup apparatus which record and/or reproduce preferably information of an optical information recording medium having a transparent substrate different in thickness with less transporting distance of the collimator lens.

What is claimed is:

1. An optical pickup apparatus comprising:

(a) a laser source for emitting a laser light beam;

(b) a converging optical system for converging the light beam emitted from the laser source onto an information recording surface through a transparent substrate of an optical information recording medium, the converging optical system including a surface so that a spherical aberration is discontinuous in a third numerical aperture (NA3) on a side of the optical information recording medium, and the third numerical aperture (NA3) is satisfied the following condition, $$NA1 > NA3 \geq NA2$$

wherein the first numerical aperture (NA1) is a numerical aperture of the converging optical system on a side of a first optical information recording medium having a first thickness (t1) of transparent substrate, required for obtaining information from the information recording surface of the first optical information recording medium, and the second numerical aperture (NA2) is a numerical aperture of the converging optical system on a side of a second optical information recording medium having a second thickness (t2), which is thicker than the first thickness (t1), of transparent substrate, required for obtaining information from the information recording surface of the second optical information recording medium; and (c) a light detecting means for detecting a light beam reflected from the information recording surface of the optical information recording medium.

2. The optical pickup apparatus of claim 1, wherein the following condition is satisfied:

$$6 \mu m < |L/M| < 18 \mu m,$$

where M represents a magnification of the information recording surface of the optical information recording medium to the light detecting means, and L represent a length of one side of a light receiving portion of the light detecting means to detect a focusing error signal.

3. The optical pickup apparatus of claim 1 further comprising:
a diverging degree changing means for changing a diverging degree of the light beam incident to the converging optical system; and
a control means for controlling a change of the diverging degree of the diverging degree changing means according to either the first or second optical information recording medium.

4. The optical pickup apparatus of claim 1, wherein a best fit wavefront aberration of the optical pickup apparatus through the first thickness (t1) of transparent substrate of the optical pickup apparatus is not more than 0.05 λrms, where λ represents an emitting wavelength of the laser source when information is obtained from the information recording surface of the first optical information recording medium.

5. The optical pickup apparatus of claim 1, wherein a best fit wavefront aberration of the optical pickup apparatus through the second thickness (t2) of transparent substrate of the optical pickup apparatus within the third numerical aperture (NA3) is not more than 0.07 λrms, where λ represents an emitting wavelength of the laser source when information is obtained from the information recording surface of the second optical information recording medium.

6. The optical pickup apparatus of claim 1, wherein on the lens surface having the discontinuous spherical aberration, a spherical aberration corresponding to half the third numerical aperture (NA3) is over-corrected more than that corresponding to the third numerical aperture when the first thickness (t1) of transparent substrate is used.

7. The optical pickup apparatus of claim 1, wherein the first thickness (t1) is 0.6 mm, and the first numerical aperture (NA1) is λ/1.14 μm, where λ represents an emitting wavelength of the laser source when information is obtained from the information recording surface of the first optical information recording medium.

8. The optical pickup apparatus of claim 1, wherein the second thickness (t2) is 1.2 mm, and the second numerical aperture (NA2) is λ/1.75 μm, where λ represents an emitting wavelength of the laser source when information is obtained from the information recording surface of the second optical information recording medium.

9. The optical pickup apparatus of claim 1, wherein the second thickness (t2) is 1.2 mm, and the second numerical aperture (NA2) is λ/2.46 μm, where λ represents an emitting wavelength of the laser source when information is obtained from the information recording surface of the second optical information recording medium.

10. The optical pickup apparatus of claim 1, wherein the laser source has a light source for emitting a light beam having a first wavelength λ1 to obtain an information from the information recording surface of the first optical information recording medium, and a light source for emitting a light beam having a second wavelength λ2 to obtain an information from the information recording surface of the second optical information recording medium.

11. An objective lens for use in an optical pickup apparatus for converging a light beam from a laser source onto an information recording surface through a transparent substrate of an optical information recording medium, the objective lens comprising:
a lens surface so that a spherical aberration is discontinuous in a third numerical aperture (NA3) on a side of the optical information recording medium, and the third numerical aperture (NA3) is satisfied the following condition,

NA1>NA3≧NA2 wherein the first numerical aperture (NA1) is a numerical aperture of the objective lens on a side of a first optical information recording medium having a first thickness (t1) of transparent substrate, required for obtaining information from the information recording surface of the first optical information recording medium, and the second numerical aperture (NA2) is a numerical aperture of the objective lens on a side of a second optical information recording medium having a second thickness (t2), which is thicker than the first thickness (t1), of transparent substrate, required for obtaining information from the information recording surface of the second optical information recording medium.

12. The objective lens of claim 11, wherein a best fit wavefront aberration of the objective lens through the first thickness (t1) of transparent substrate of the optical information recording medium is not more than 0.05 λrms, where λ represents an emitting wavelength of the laser source when information is obtained from the information recording surface of the first optical information recording medium.

13. The objective lens of claim 11, wherein a best fit wavefront aberration of the objective lens through the second thickness (t2) of transparent substrate of the optical information recording medium within the third numerical aperture (NA3) is not more than 0.07 λrms, where λ represents an emitting wavelength of the laser source when information is obtained from the information recording surface of the second optical information recording medium.

14. The objective lens of claim 11, wherein on the lens surface having the discontinuous spherical aberration, a spherical aberration corresponding to half the third numerical aperture (NA3) is over-corrected more than that corresponding to the third numerical aperture when the first thickness (t1) of transparent substrate is used.

15. The objective lens of claim 11, wherein the first thickness (t1) is 0.6 mm, and the first numerical aperture (NA1) is λ/1.14 μm, where λ represents an emitting wavelength of the laser source when information is obtained from the information recording surface of the first optical information recording medium.

16. The objective lens of claim 11, wherein the second thickness (t2) is 1.2 mm, and the second numerical aperture (NA2) is λ/1.75 μm, where λ represents an emitting wavelength of the laser source when information is obtained from the information recording surface of the second optical information recording medium.

17. The objective lens of claim 11, wherein the second thickness (t2) is 1.2 mm, and the second numerical aperture (NA2) is λ/2.46 μm, where λ represents an emitting wavelength of the laser source when information is obtained from the information recording surface of the second optical information recording medium.

18. An objective lens for use in an optical pickup apparatus for converging a light beam from a laser source onto an information recording surface through a transparent substrate of a first optical information recording medium having a first thickness (t1), the objective lens comprising:
a lens surface so that a spherical aberration is discontinuous in a third numerical aperture (NA3) on a side of the first optical information recording medium, and the third numerical aperture (NA3) is satisfied the following condition,
a first numerical aperture (NA1)>the third numerical aperture (NA3)
wherein the first numerical aperture (NA1) is a numerical aperture of the objective lens on a side of the first optical information recording medium, to converge the light beam from the laser source onto the information recording surface of the first optical information recording medium, and wherein in the first numerical aperture (NA1), a best fit wavefront aberration of the objective lens is not more than 0.05 λrms, where λ represents an emitting wavelength of the laser source when information is obtained from the information recording surface of the first optical information recording medium.

19. The objective lens of claim 18, wherein on the lens surface having the discontinuous spherical aberration, a spherical aberration corresponding to half the third numerical aperture (NA3) is over-corrected more than that corresponding to the third numerical aperture when the first thickness (t1) of transparent substrate is used.

20. The objective lens of claim 18, wherein the first thickness (t1) is 0.6 mm, and the first numerical aperture (NA1) is λ/1.14 μm or more, where λ represents an emitting wavelength of the laser source when information is obtained from the information recording surface of the first optical information recording medium.

* * * * *